US006549490B1

(12) United States Patent
Howarth

(10) Patent No.: US 6,549,490 B1
(45) Date of Patent: Apr. 15, 2003

(54) EXTERNAL DRIVE COMPONENTS FOR A COMPUTER AND METHODS FOR OPERATING EXTERNAL DRIVE COMPONENTS

(75) Inventor: James Howarth, Marsing, ID (US)

(73) Assignee: Micron Technology, Inc., Boise, ID (US)

(*) Notice: Subject to any disclaimer, the term of this patent is extended or adjusted under 35 U.S.C. 154(b) by 0 days.

(21) Appl. No.: 09/553,305

(22) Filed: Apr. 20, 2000

(51) Int. Cl.[7] ............................................... G11B 21/08
(52) U.S. Cl. ................................ 369/30.27; 369/53.18; 713/324
(58) Field of Search .......................... 369/30.27, 53.18, 369/53.22, 53.11, 53.12, 53.13, 33.01, 47.23, 47.24; 713/200, 324, 321, 330

(56) References Cited

U.S. PATENT DOCUMENTS

| | | | | |
|---|---|---|---|---|
| 5,859,968 A | * | 1/1999 | Brown et al. ................ | 713/200 |
| 5,862,113 A | * | 1/1999 | Tsuyuguchi et al. .......... | 369/50 |
| 5,870,355 A | * | 2/1999 | Fujihara ...................... | 369/32 |
| 5,894,579 A | * | 4/1999 | Fujihara ...................... | 713/324 |
| 6,173,430 B1 | * | 1/2001 | Massoudi .................... | 714/775 |
| 6,317,836 B1 | * | 11/2001 | Goren et al. ................ | 713/200 |

* cited by examiner

Primary Examiner—Tan Dinh

(74) Attorney, Agent, or Firm—Perkins Coie LLP

(57) ABSTRACT

External drive components and computers having external drive components with disabling systems that restrict access to software and other computer-readable media in the external drive components only to authorized users. In one embodiment, a computer includes a processor, a power supply coupled to the processor, and an external drive component. The external drive component can include a head capable of reading and/or writing data on a computer-readable medium, a holder configured to hold the computer-readable medium in an operating position in which the head can read data from the computer-readable medium, and a drive assembly coupled to the holder. The drive assembly moves the holder and/or the computer-readable medium from the operating position to a load/unload position in which the computer-readable medium is accessible to a user. The computer can also include a disabling system coupled to the drive assembly. The disabling system selectively disables the drive assembly from moving the holder and/or the computer-readable medium from the operating position to the load/unload position. In one embodiment, for example, the disabling system comprises a computer-readable medium coupled to the processor. The computer-readable medium can contain a computer-readable program that causes the processor to: (a) disable the drive assembly upon a protected disable command to prevent the holder from being moved from the operating position to the load/unload position; and (b) enable the drive assembly upon a protected enable command to activate the drive assembly for moving the holder between the operating and the load/unload positions.

40 Claims, 3 Drawing Sheets

EXTERNAL DRIVE COMPONENTS FOR A COMPUTER AND METHODS FOR OPERATING EXTERNAL DRIVE COMPONENTS

TECHNICAL FIELD

The technical field relates to computers and external drive components for computers that read data from and/or write data to CD-ROMs, disks, tapes or other computer-readable media. More specifically, several embodiments of the invention relate to external drive components that selectively prevent access to the computer-readable media during operation of the computer.

BACKGROUND

Personal computers typically have a power supply, random memory devices, permanent memory devices and a processor housed within a protective chassis. Most personal computers also have a number of external drive components with trays or slots for receiving CD-ROMs, floppy disks, tapes or other types of computer-readable media. The external drives, for example, are typically CD drives, floppy disk drives, ZIP drives or JAZZ drives.

A user typically operates an external drive component by loading the desired type of computer-readable media into a corresponding drive to execute software stored on the media, store files on the media, or retrieve files from the media. For example, to operate a CD-ROM drive, a user typically moves a carriage into a load/unload position, places a CD on the carriage, and then moves the carriage into an operating position. The CD drive and the CD are typically inaccessible to a user when the carriage is in the operating position. After using the particular CD, the user typically unloads the CD by pressing an external button or executing a software command to move the carriage to the load/unload position in which the CD is accessible to the user.

One drawback of CD drives and other types of external drive components is that foreign objects can be placed in the external drives when the carriage is in the load/unload position. In households with young children, for example, food items or other foreign objects are repeatedly placed in the external drive components. This problem is also a concern for computer labs in schools or libraries because vandals may also insert foreign objects into the external drives. Therefore, one drawback of existing external drives is that they are subject to being damaged by inserting foreign objects into the carriage or the slot.

Another drawback of existing external drive components is that it is easy to remove CDs or other computer-readable media from the external drive components. This problem is particularly acute in schools, libraries or large companies where the users can steal CDs or other media from the external drive components. Therefore, many schools and libraries do not provide software that many users would like to use.

SUMMARY

Several embodiments of external drive components and computers having external drive components are directed toward computers with disabling systems that restrict access to software and other computer-readable media in the external drive components. In one embodiment, a computer includes a processor, a power supply coupled to the processor, and an external drive component. The external drive component can include a head capable of reading and/or writing data on a computer-readable medium, a holder configured to hold the computer-readable medium in an operating position in which the head is adjacent to the computer-readable medium, and a drive assembly coupled to the holder. The drive assembly moves the holder and/or the computer-readable medium from the operating position to a load/unload position in which the computer-readable medium is accessible to a user.

The computer can also include a disabling system coupled to the drive assembly. The disabling system selectively disables the drive assembly from moving the holder and/or the computer-readable medium from the operating position to the load/unload position. In one embodiment, the disabling system comprises a separate computer-readable medium having a computer-readable control program. The separate computer-readable medium, for example, can be a hard disk drive coupled to the processor. The computer-readable control program of one embodiment causes the processor to: (a) disable the drive assembly upon a protected disable command to prevent the holder from being moved from the operating position to the load/unload position; and (b) enable the drive assembly upon a protected enable command to activate the drive assembly for moving the holder between the operating and the load/unload positions.

In other embodiments, the disabling system comprises a lockout device that selectively opens a switch to disconnect the drive assembly from a power supply without disconnecting the head assembly from a power supply. The lockout device of this embodiment also selectively closes the switch to connect the drive assembly with the power supply. Another embodiment of a disabling system in accordance with the present invention is a mechanical lockout device that prevents a mechanical actuator from moving the holder from the operating position to the load/unload position. Several embodiments of disabling systems accordingly allow the external drive components to operate for reading and/or writing data, but they prevent unauthorized users from opening the external drive components.

DETAILED DESCRIPTION

The presently described embodiments are directed toward external drive components and computers that have a disabling system for selectively preventing access to computer-readable media loaded in the external drives. Many specific details of the invention are described below with reference to CD-ROM external drives to provide a thorough understanding of such embodiments. The present invention, however, can also be practiced with floppy drives, magneto-optical drives, floptical drives, tape backups and other types of external drives. A person skilled in the art will thus understand that the invention may have additional embodiments, or that the invention may be practiced without several of the details described below.

Figure 1:
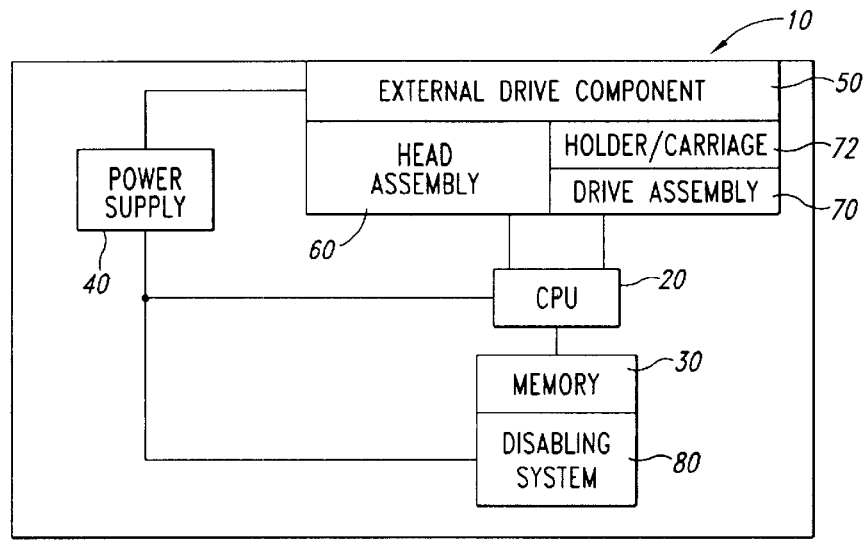
FIG. 1 is a schematic view of a computer having an external drive component with a disabling system in accordance with one embodiment of the invention.

FIG. 1 is a schematic view of a computer 10 in accordance with one embodiment of the invention. In this embodiment, the computer 10 includes a central processing unit (CPU) 20, a first memory drive 30 coupled to the CPU 20, and a power supply 40 electrically coupled to both the CPU 20 and the first memory drive 30. The CPU 20 generally includes a processor, RAM devices, and several other components known in the art. The first memory device 30 is generally a hard disk drive known in the art, and the power supply 40 is a typical power supply for computers.

The computer 10 also includes an external drive component 50 having a head assembly 60, a drive assembly 70, and a holder 72 coupled to the drive assembly 70. The external drive component 50 is coupled to the power supply 40, and the head assembly 60 and the drive assembly 70 of this embodiment are coupled to the CPU 20. The head assembly 60 is capable of reading and/or writing data on a computer-readable medium (e.g., floppy disks, CD-ROMs, tapes, etc.). The drive assembly 70 moves the holder between (a) an operating position in which the head assembly 60 can read and/or write data on the computer-readable medium, and (b) a load/unload position in which the holder 72 is accessible to a user to load/unload the computer-readable medium.

Figure 2:
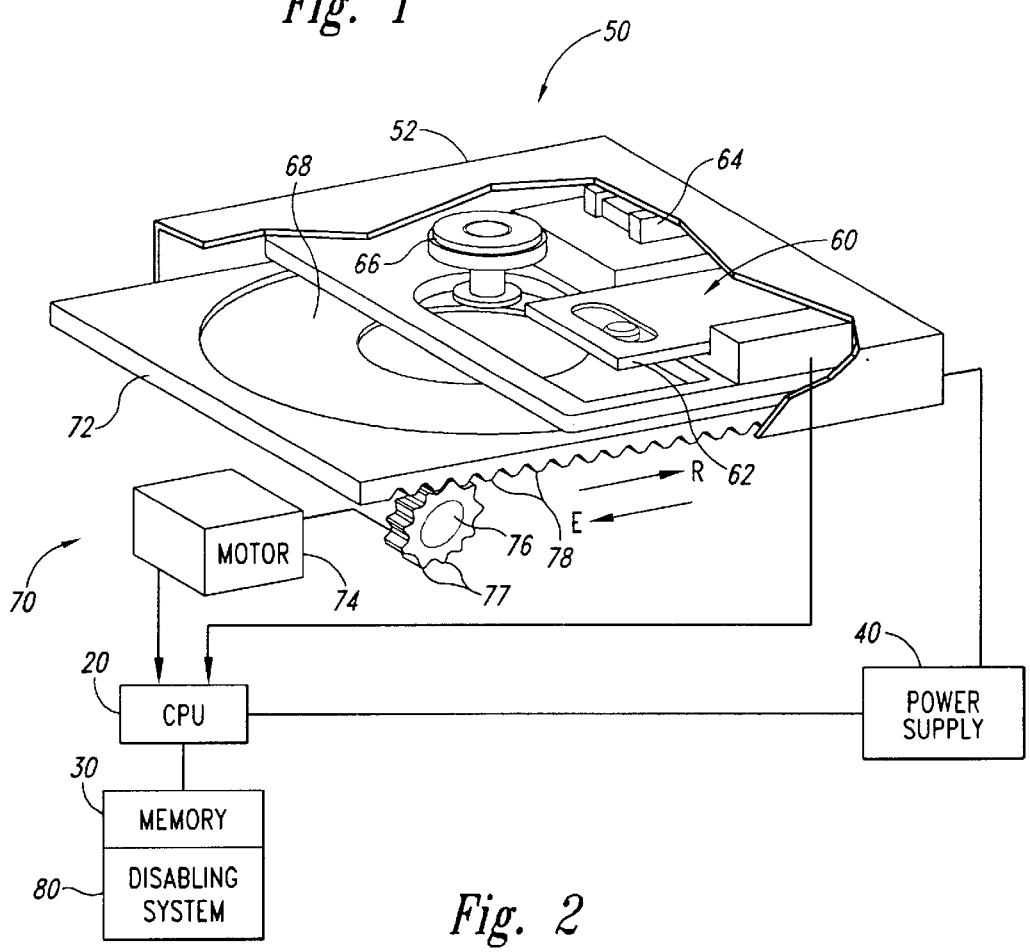
FIG. 2 is a partially schematic isometric view of an external drive component in accordance with an embodiment of the invention.

FIG. 2 is a partially schematic isometric view of one embodiment of the external drive component 50. In this embodiment, the external drive component 50 is a CD-ROM drive 52 including an optical head assembly 60 having a laser head 62, a gantry 64 for selectively moving the laser head 62, and a drive spindle 66 for rotating a CD 68. The head assembly 60 is coupled to the CPU 20 so that data read by the laser head 62 can be transmitted to the CPU 20, and the CPU 20 can control the gantry 64 and the drive spindle 66 to accurately position the laser 62 and the CD 68 relative to each other.

The CD-ROM drive 52 also includes the drive assembly 70 and the holder 72. The drive assembly 70 can include a motor 74 coupled to the CPU 20 and a transfer mechanism coupled to the motor 74. The transfer mechanism in this embodiment is a gear 76 having a plurality of teeth 77, and the holder 72 is a carriage or tray having a plurality of teeth 78 along a track. The teeth 77 of the gear 76 mesh with the teeth 78 of the holder 72. Accordingly, rotation of the gear 76 in a first direction retracts the holder 72 into the CD-ROM drive 52 (arrow R) until the holder 72 is in an operating position in which the spindle 66 engages the CD 68 and the laser head 62 can read data from the CD 68. The motor 74 can also rotate the gear 76 in a second direction to move the holder 72 in an opposite direction (arrow E) until a portion of the holder 72 extends beyond the housing of the computer in a load/unload position in which the CD 68 is accessible to a user.

Referring to FIGS. 1 and 2 together, the computer 10 also includes a disabling system 80 for preventing the drive assembly 70 from moving the holder 72 from the operating position to the load/unload position. In this embodiment, the disabling system 80 comprises a computer-readable control program stored on a computer-readable medium, such as the first memory drive 30. The computer-readable control program includes a disabling module or routine that can that cause the processor 20 to disable the motor 74 of the drive assembly 70 upon a protected disable command to prevent the holder 72 from being moved from the operating or retracted position to the load/unload or extended position. The computer-readable program code can also include an enabling module or routine that causes the processor 20 to enable the motor 74 upon a protected enable command to move the holder 72 between the operating position and the load/unload position. Upon inputting the enable command, the computer-readable program code can cause the processor 20 to (a) activate the motor 74 to immediately move the holder 72, or (b) place the motor 74 in an enabled mode in which another computer command or an external switch can be used to activate the motor. The protected disable command and enable command can be a password system that the computer-readable program code uses to effectuate either the disabling or the enabling of the motor 74.

Figure 3:
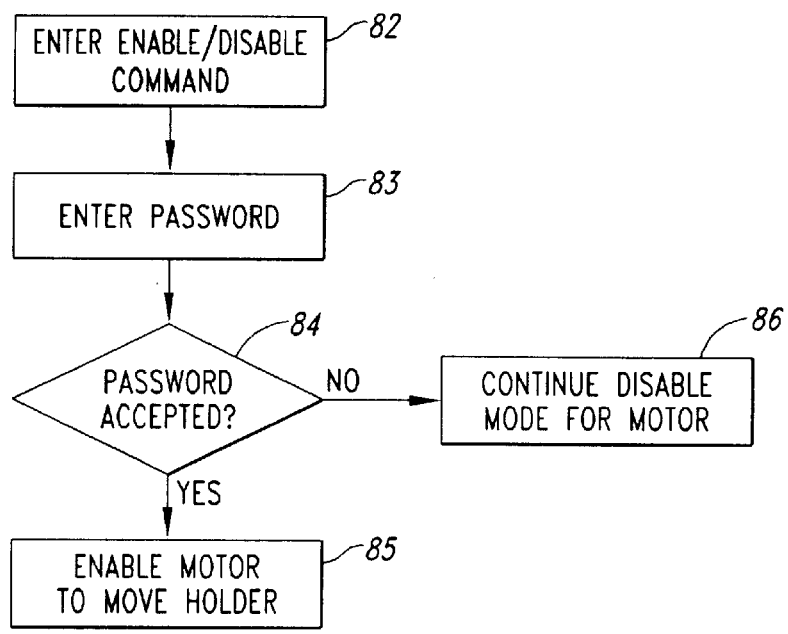
FIG. 3 is a flow chart of a process for operating a computer having an external drive component with a disabling system in accordance with an embodiment of the invention.

FIG. 3 is a flow chart representing a routine for one embodiment of a computer-readable control program for the disabling system 80. Referring to FIGS. 2 and 3 together, one embodiment of this routine begins with a command procedure 82 including receiving a command directing the processor 20 to enable or disable the motor 74 of the drive assembly 70. This routine continues with a password process 83 in which a prompt appears requesting a user to enter a password. The password is protected to establish that the user has authority to open the external drive component. The control program then compares the entered password with stored passwords for authorized users at a decision stage 84. If the entered password matches a stored password, the routine continues with an enabling process 85 in which the motor 74 is enabled to move the holder 72 between the operating position and the load/unload position. If the entered password does not match a stored password, the routine continues with a lockout process 86 in which the disabled mode for the motor 70 is continued so that the holder 72 cannot be moved from the operating position to the load/unload position. The routine shown in FIG. 3 is illustrative of only one type of computer program for locking out or disabling the motor 74 using a password system. Based upon the present disclosure, it will be appreciated that a person skilled in the art can develop the computer-readable program code to execute the routine illustrated in FIG. 3 and other routines for locking out the motor 74 while still allowing the head assembly 60 to continue operating for reading and/or writing data on the CD 68.

One advantage of the embodiment of the computer 10 and the disabling system 80 described above with reference to FIGS. 1–3 is that the external drive component 50 is less likely to be damaged by inadvertently inserting foreign objects into the holder 72 or the head assembly 60. The disabling system 80, more specifically, prevents unauthorized users from opening the holder 72 by disabling the drive assembly 70 without disabling the head assembly 60 from performing read and/or write operations. Accordingly, the external component 50 can remain operational to read and/or write data on a computer-readable medium, but an unauthorized user cannot open the holder 72. Therefore, small children or other individuals cannot insert foreign objects into the external component without first receiving the authorization to activate the drive assembly 70. The embodiment of the computer 10 described above with reference to FIGS. 1–3 is accordingly expected to substantially reduce damage to external components caused by foreign objects.

Another advantage of the embodiment of the computer 10 and the disabling system 80 described above with reference to FIGS. 1–3 is that it prevents theft of software applications. The disabling system 80 allows only authorized users to selectively enable and disable the drive assembly 70 to prevent unauthorized users from accessing the computer-readable media in the external drive component 50. The disabling system 80, moreover, does not interfere with the read and/or write operation of the external drive component 50 such that the drive system 70 can be disabled while maintaining the read and/or write capabilities of the head assembly 60. The computer 10 is accordingly particularly useful in schools, public libraries and large corporations where many users have access to computers and expensive software applications on computer-readable media are subject to being stolen. The disabling system 80 accordingly prevents theft in such situations because the knowledge of the password for the disabling system 80 can be limited to only selected system administrators. Therefore, the embodiments of the computer 10 and the disabling system 80 described above with reference to FIGS. 1–3 are expected to reduce theft or misplacement of software used in schools libraries and other situations.

Figure 4:
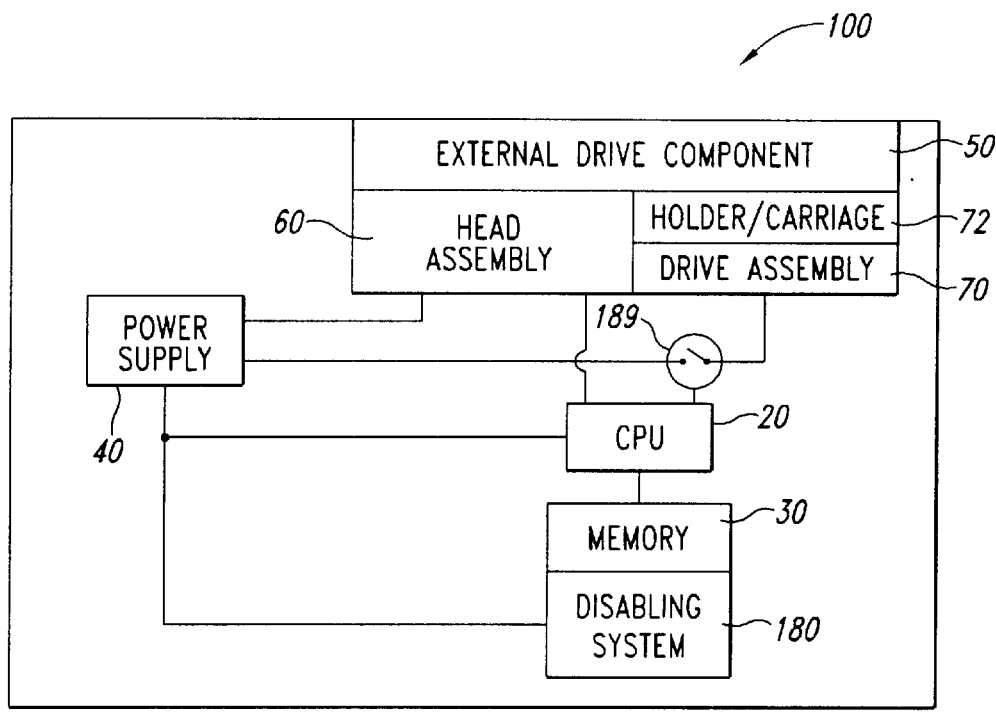
FIG. 4 is a schematic view of a computer having an external drive component with a disabling system in accordance with another embodiment of the invention.

FIG. 4 is a schematic view of a computer 100 in accordance with another embodiment of the invention. In this embodiment, like reference numbers for the computer 100 refer to the same components as those described above with reference to the computer 10. The computer 100 includes a disabling system 180 comprising a computer-readable program code stored on the first memory drive 30, and an electronic switch 189 coupling the power supply 40 to the drive assembly 70 separately from the head assembly 60. The disabling system 180 operates by controlling the CPU 20 to open or close the switch 189 to disable or enable the drive assembly 70, respectively. For example, to disable the drive assembly 70, the disabling system 180 causes the CPU 20 to open the switch 189 to disconnect the drive assembly 70 from the power supply 40. Conversely, to enable the drive assembly 70 to move the holder 72 back and forth between the operating position and the load/unload position, the disabling system 180 causes the CPU to close the switch 189 to connect the drive assembly 70 to the power supply 40.

Figure 5:
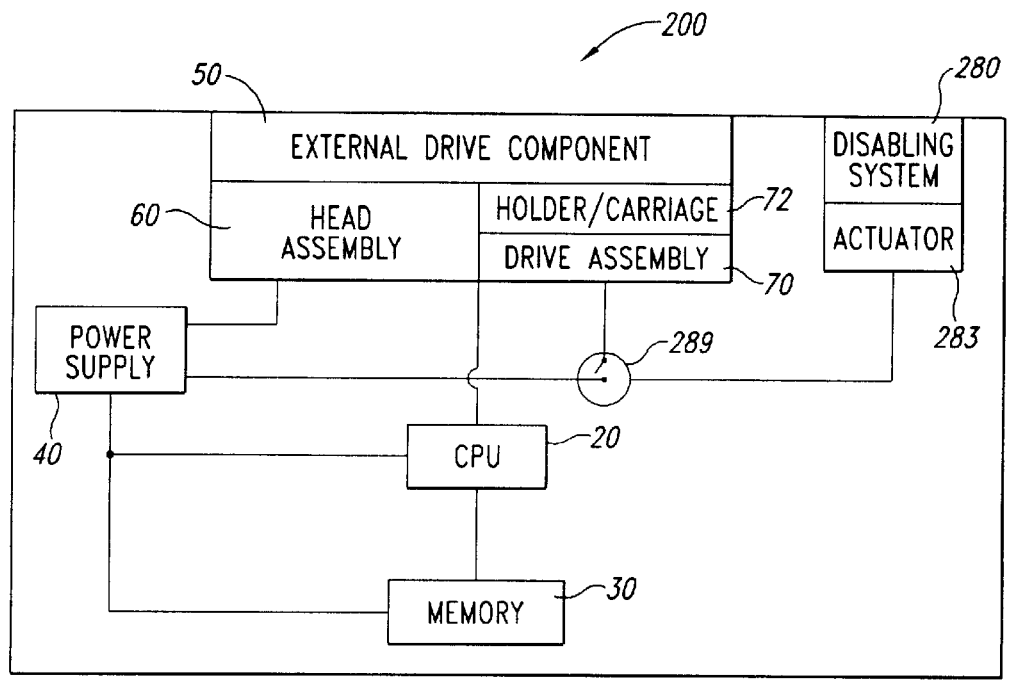
FIG. 5 is a schematic view of a computer having another external drive component with a disabling system in accordance with yet another embodiment of the invention.

FIG. 5 is a schematic view illustrating a computer 200 in accordance with still another embodiment of the invention. In this embodiment, like reference numbers for the computer 200 refer to the same components as those for the computer 10 described above with reference to FIGS. 1–3. The computer 200 includes a disabling system 280 having an actuator 283 operated by a key or punch-pad and a switch 289 between the power supply 40 and the drive assembly 70. By turning an appropriate key or entering an appropriate code on the punch-pad to activate the actuator 283, the disabling system 280 opens the switch 289 to disconnect the drive assembly 70 from the power supply 40 for preventing the drive assembly 70 from moving the holder 72 from the operating position to the load/unload position. Conversely, the actuator 283 can be activated to close the switch 289 for connecting the drive assembly 70 with the power supply 40. When the switch is closed, the drive assembly 70 can move the holder 72 between the operating and load/unload positions. The computer 200 accordingly provides a manual disabling system 280 in which authorized system administrators have the keys or the punch-pad codes for operating the actuator 283.

Figure 6:
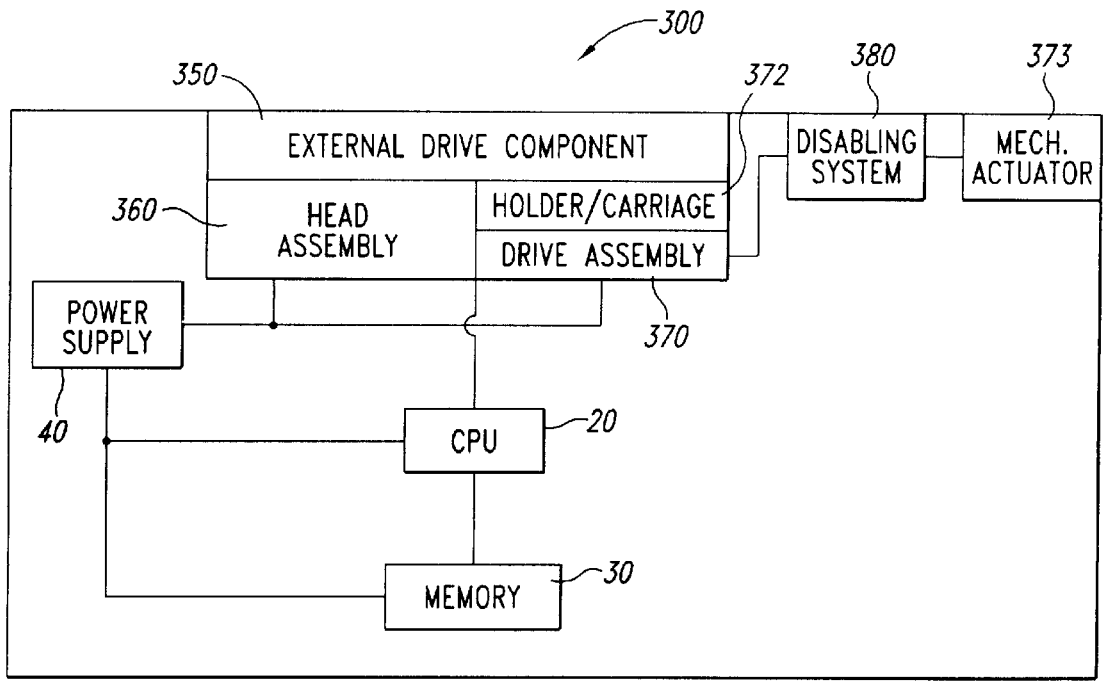
FIG. 6 is a schematic view of a computer having an external drive component in accordance with still another embodiment of the invention.

FIG. 6 illustrates a computer 300 in accordance with still another embodiment of the invention. In this embodiment, like reference numbers correspond to like components with the computer 10 illustrated in FIGS. 1–3. The computer 300 accordingly includes a CPU 20, a first memory drive 30, and a power supply 40 as described above. The computer 300 also includes an external component 350 having a head assembly 360 and a mechanical drive assembly 370 for loading and unloading a computer-readable medium. The mechanical drive assembly 370 accordingly has a carriage 372 that is moved between the operating position and the load/unload position by a mechanical actuator 373. The mechanical drive assembly 370 and the actuator 373 can be the same as those found on many 3.5 inch floppy disk drives that have mechanical drive assemblies with mechanical push-button actuators. The computer 300 further includes a disabling system 380 that prevents the mechanical actuator 373 from moving the holder 372 from the operating position to the load/unload position. A suitable disabling system can be a key and lock system that prevents the mechanical actuator 373 from being moved. Suitable key/lock systems are similar to file cabinet locks manufactured by Harper. For example, in the case of a floppy disk drive with a push-button mechanical actuator, the key/lock can be moved to a lock position in which the lock engages the mechanical actuator to prevent it from being depressed for ejecting a floppy disk from the drive.

From the foregoing it will be appreciated that, although specific embodiments of the invention have been described herein for purposes of illustration, various modifications may be made without deviating from the spirit and scope of the invention. Accordingly, the invention is not limited except as by the appended claims.

What is claimed is:

1. A computer, comprising:
    a processor;
    a power supply coupled to the processor;
    a drive component including
        a head capable of reading, writing, or both reading and writing data on a computer-readable medium, the head being coupled to the processor;
        a holder configured to hold the computer-readable medium in an operating position in which the head can read, write, or both read and write data on the computer-readable medium;
        a drive assembly coupled to the holder, the drive assembly being configured to selectively move the holder, the computer-readable medium, or the holder and the computer-readable medium from the operating position to an access position, the computer-readable medium being accessible to a user in the access position; and
    a disabling system coupled to the drive assembly, the disabling system, without disabling the head from reading, writing, or both reading and writing the data, selectively disabling the drive assembly from moving the holder, the computer-readable medium, or both the holder and the computer-readable medium from the operating position to the access position.

2. The computer of claim 1 wherein the drive component is a CD-ROM drive, and wherein:
    the holder comprises a carriage that moves between a retracted position corresponding to the operating position and an extended position corresponding to the access position;
    the drive assembly comprises an electrical motor coupled to the processor and a transfer mechanism coupled to the electrical motor and the carriage, wherein the transfer mechanism transmits mechanical output from the motor to move the carriage between the retracted position and the extended position; and the disabling system comprises a computer-readable medium coupled to the processor, the computer-readable medium containing a computer-readable program code that causes the processor to (a) disable the electrical motor upon a protected disable command to prevent the carriage from being moved from the retracted position to the extended position, and to (b) enable the electrical motor upon a protected enable command to activate the motor for moving the carriage between the retracted position and the extended position.

3. The computer of claim 1 wherein the drive component is a CD-ROM drive, and wherein:

the drive assembly comprises an electrical motor coupled to the processor, a switch coupled to the motor and to the power supply to connect the motor with or disconnect the motor from the power supply separately from the head, and a transfer mechanism coupled to the electrical motor and the holder, wherein the transfer mechanism transmits mechanical output from the motor to move the holder between the operating position and the access position; and the disabling system comprises a lockout device that selectively locks the switch in an open configuration to disconnect the motor from the power supply and selectively releases the switch to allow the switch to be placed in a closed configuration for connecting the motor with the power supply.

4. The computer of claim 3 wherein the lockout device comprises a computer-readable medium coupled to the processor, the computer-readable medium containing a computer-readable program code that causes the processor to (a) open the switch and disconnect the electrical motor from the power supply upon a protected disable command, and to (b) close the switch and connect the electrical motor with the power supply upon a protected enable command.

5. The computer of claim 3 wherein the lockout device comprises a manual actuator coupled to the switch, the actuator being moveable between an off position that opens the switch and disconnects the motor from the power supply and an activated position that closes the switch and connects the motor to the power supply.

6. The computer of claim 1 wherein:

the drive assembly comprises a mechanical actuator accessible to a user and coupled to the holder, the mechanical actuator being in a first position when the holder is in the operating position and the mechanical actuator being moveable from the first position to a second position by the user to move the holder from the operating position to the access position; and the disabling system comprises a mechanical lock coupled to the mechanical actuator, the mechanical lock being moveable between a lock position in which the mechanical lock disables the mechanical actuator from moving the holder from the operating position to the access position and a release position in which the mechanical actuator is enabled to move the holder from the operating position to the access position.

7. A computer, comprising:

a processor;

a power supply coupled to the processor;

a drive component including a head capable of reading, writing, or both reading and writing data on a computer-readable medium, the head being coupled to the processor;

a carriage configured to hold the computer-readable medium, the carriage being moveable between an operating position in which the head can read, write, or both read and write data on the computer-readable medium and an access position in which the computer-readable medium can be removed from the carriage;

a drive assembly coupled to the carriage, the drive assembly being configured to selectively move the carriage from the operating position to the access position; and a lockout system coupled to the drive assembly, the lockout system, without disabling the head from reading, writing, or both reading and writing the data, selectively disabling the drive assembly from moving the carriage from the operating position to the access position.

8. The computer of claim 7 wherein the external component is a CD-ROM drive, and wherein:

the drive assembly comprises an electrical motor coupled to the processor and a transfer mechanism coupled to the electrical motor and the carriage, wherein the transfer mechanism transmits mechanical output from the motor to move the carriage between the operating position and the access position; and the lockout system comprises a computer-readable medium coupled to the processor, the computer-readable medium containing a computer-readable program code that causes the processor to (a) disable the electrical motor upon a protected disable command to prevent the carriage from being moved from the operating position to the access position, and to (b) enable the electrical motor upon a protected enable command to activate the motor for moving the carriage between the operating position and the access position.

9. The computer of claim 7 wherein the external component is a CD-ROM drive, and wherein:

the drive assembly comprises an electrical motor coupled to the processor, a switch coupled to the motor and to the power supply to connect the motor with or disconnect the motor from the power supply separately from the head, and a transfer mechanism coupled to the electrical motor and the carriage, wherein the transfer mechanism transmits mechanical output from the motor to move the carriage between the operating position and the access position; and the lockout system comprises a lockout device that selectively locks the switch in an open configuration to disconnect the motor from the power supply and selectively releases the switch to allow the switch to be placed in a closed configuration for connecting the motor with the power supply.

10. The computer of claim 9 wherein the lockout device comprises a computer-readable medium coupled to the processor, the computer-readable medium containing a computer-readable program code that causes the processor to (a) open the switch and disconnect the electrical motor from the power supply upon a protected disable command, and to (b) close the switch and connect the electrical motor with the power supply upon a protected enable command.

11. The computer of claim 9 wherein the lockout device comprises a manual actuator coupled to the switch, the actuator being moveable between an off position that opens the switch and disconnects the motor from the power supply and an activated position that closes the switch and connects the motor to the power supply.

12. A computer, comprising:
a processor;
a first memory drive coupled to the processor, wherein the first memory drive is a computer-readable medium for storing computer readable programs;
a power supply coupled to the processor and the first memory drive;
a drive component including
    a head operatively coupled to the processor and electrically coupled to the power supply, the head being capable of reading, writing, or both reading and writing data on a computer-readable medium;
    a holder configured to hold the computer-readable medium, the holder being moveable between an operating position in which the head can read, write, or both read and write data on the computer-readable medium and an access position in which the computer-readable medium can be removed from the holder;
    a drive assembly having a motor and a transfer mechanism, the motor being coupled to the power supply and the processor, and the transfer mechanism being coupled to the motor and the holder, wherein the motor drives the transfer mechanism to selectively move the holder between the operating and access positions; and
a disabling system comprising a computer-readable program code stored in the first memory drive, the computer-readable program code including
    a disabling module that is activated by a protected disable command, the disabling module causing the processor to disable the motor to prevent the holder from being moved from the operating position to the access position; and
    an enabling module that is activated by a protected enable command, the enabling module causing the processor to activate the motor to move the holder between the operating position and the access position.

13. A drive component for a computer, comprising:
a head capable of reading, writing, or both reading and writing data on a computer-readable medium;
a holder configured to hold the computer-readable medium in an operating position in which the head can read, write, or both read and write data on the computer-readable medium;
a drive assembly coupled to the holder, the drive assembly being configured to selectively move the holder and/or the computer-readable medium from the operating position to an access position, the computer-readable medium being removable from the external drive component in the access position; and
a disabling system coupled to the drive assembly, the disabling system, without disabling the head from reading, writing, or both reading and writing the data, selectively disabling the drive assembly from moving the holder, the computer-readable medium, or both the holder and the computer-readable medium from the operating position to the access position.

14. The drive component of claim 13 wherein the drive component is a CD-ROM drive coupleable to a processor of a computer, and wherein:
the holder comprises a carriage that moves between a retracted position corresponding to the operating position and an extended position corresponding to the access position;
the drive assembly comprises an electrical motor coupleable to the processor and a transfer mechanism coupled to the electrical motor and the holder, wherein the transfer mechanism transmits mechanical output from the motor to move the holder between the retracted position and the extended position; and
the disabling system comprises a computer-readable medium coupleable to the processor, the computer-readable medium containing a computer-readable program code that causes the processor to (a) disable the electrical motor upon a protected disable command to prevent the carriage from being moved from the retracted position to the extended position, and to (b) enable the electrical motor upon a protected enable command to activate the motor for moving the carriage between the retracted position and the extended position.

15. The drive component of claim 13 wherein the drive component is a CD-ROM drive coupleable to a processor of a computer, and wherein:
the drive assembly comprises an electrical motor coupleable to the processor, a switch coupled to the motor and coupleable to a power supply to connect the motor with or disconnect the motor from the power supply separately from the head, and a transfer mechanism coupled to the electrical motor and the holder, wherein the transfer mechanism transmits mechanical output from the motor to move the holder between the operating position and the access position; and
the disabling system comprises a lockout device that selectively locks the switch in an open configuration to disconnect the motor from the power supply and selectively releases the switch to allow the switch to be placed in a closed configuration for connecting the motor with the power supply.

16. The drive component of claim 15 wherein the lockout device comprises a computer-readable medium coupleable to the processor, the computer-readable medium containing a computer-readable program code that causes the processor to (a) open the switch and disconnect the electrical motor from the power supply upon a protected disable command, and (b) close the switch and connect the electrical motor with the power supply upon a protected enable command.

17. The drive component of claim 15 wherein the lockout device comprises a manual actuator coupled to the switch, the actuator being moveable between an off position that opens the switch and disconnects the motor from the power supply and an activated position that closes the switch and connects the motor to the power supply.

18. The drive component of claim 13 wherein:
the drive assembly comprises a mechanical actuator accessible to a user and coupled to the holder, the mechanical actuator being in a first position when the holder is in the operating position and the mechanical actuator being moveable from the first position to a second position by a user to move the holder from the operating position to the access position; and
the disabling system comprises a mechanical lock coupled to the mechanical actuator, the mechanical lock being moveable between a lock position in which the mechanical lock disables the mechanical actuator from moving the holder from the operating position to the access position and a release position in which the mechanical actuator is enabled to move the holder from the operating position to the load/unload position.

19. A drive component for a computer, comprising:
a head capable of reading data from a computer-readable medium;
a carriage configured to hold the computer-readable medium, the carriage being moveable between an operating position in which the head can read, write, or both read and write data on the computer-readable medium and an access position in which the computer-readable medium can be removed from the carriage;
a drive assembly coupled to the carriage, the drive assembly being configured to selectively move the carriage from the operating position to the access position; and
a lockout system coupled to the drive assembly, the lockout system, without disabling the head from reading, writing, or both reading and writing the data, selectively disabling the drive assembly from moving the carriage from the operating position to the access position.

20. The drive component of claim 19 wherein:
the drive assembly comprises an electrical motor coupled to the processor and a transfer mechanism coupled to the electrical motor and the carriage, wherein the transfer mechanism transmits mechanical output from the motor to move the carriage between the operating position and the access position; and
the disabling system comprises a computer-readable medium coupled to the processor, the computer-readable medium containing a computer-readable program code that causes the processor to (a) disable the electrical motor upon a protected disable command to prevent the carriage from being moved from the operating position to the access position, and to (b) enable the electrical motor upon a protected enable command to activate the motor for moving the carriage between the operating position and the access position.

21. The drive component of claim 19 wherein:
the drive assembly comprises an electrical motor coupled to the processor, a switch coupled to the motor and to the power supply to connect the motor with or disconnect the motor from the power supply separately from the head, and a transfer mechanism coupled to the electrical motor and the carriage, wherein the transfer mechanism transmits mechanical output from the motor to move the carriage between the operating position and the access position; and
the disabling system comprises a lockout device that selectively locks the switch in an open configuration to disconnect the motor from the power supply and selectively releases the switch to allow the switch to be placed in a closed configuration for connecting the motor with the power supply.

22. The drive component of claim 21 wherein the lockout device comprises a computer-readable medium coupled to the processor, the computer-readable medium containing a computer-readable program code that causes the processor to (a) open the switch and disconnect the electrical motor from the power supply upon a protected disable command, and to (b) close the switch and connect the electrical motor with the power supply upon a protected enable command.

23. The drive component of claim 21 wherein the lockout device comprises a manual actuator coupled to the switch, the actuator being moveable between an off position that opens the switch and disconnects the motor from the power supply and an activated position that closes the switch and connects the motor to the power supply.

24. A method for operating a computer having a processor, a memory device coupled to the processor, a power supply coupled the memory device and the processor, and a drive component for reading, writing, or both reading and writing data on a computer-readable medium, the method comprising:
loading the computer-readable medium into the drive component by moving the computer readable medium into an operating position in which the drive component can read, write, or both read and write data on the computer-readable medium;
disabling the drive component from moving the computer-readable medium from the operating position to an access position to prevent access to the computer-readable medium; and
operating the drive component to read, write, or both read and write data on the computer-readable medium while the drive component is disabled from moving the computer-readable medium from the operating position to the access position.

25. The method of claim 24, wherein:
the drive component comprises a head capable of reading, writing, or both reading and writing data on the computer-readable medium, a holder configured to hold the computer-readable medium in the operating position, and a drive assembly coupled to the holder, wherein the drive assembly is configured to selectively move the computer-readable medium between the operating position and the access position; and
disabling the drive component comprises electrically deactivating the drive assembly without deactivating the head.

26. The method of claim 24, wherein:
the drive component comprises a head capable of reading, writing, or both reading and writing data on the computer-readable medium, a holder configured to hold the computer-readable medium in the operating position, and a drive assembly coupled to the holder, wherein the drive assembly is configured to selectively move the computer-readable medium between the operating position and the access position; and
disabling the drive component comprises preventing the drive assembly from moving the computer-readable medium from the operating position to the access position without deactivating the head.

27. The method of claim 24, wherein:
the drive component comprises a head capable of reading, writing, or both reading and writing data on the computer-readable medium, a holder configured to hold the computer-readable medium in the operating position, and a drive assembly coupled to the holder, wherein the drive assembly is configured to selectively move the computer-readable medium between the operating position and the access position;
the drive component is disabled using a disabling system, the disabling system comprising a second computer-readable medium coupled to the processor, the second computer-readable medium containing a program code that causes the processor to (a) disable the drive assembly upon a protected disable command to prevent the holder from being moved from the operating position to the access position, and to (b) enable the drive assembly upon a protected enable command to activate the drive assembly for moving the holder between the operating and the access positions; and
disabling the drive component comprises entering the protected disable command.

28. The method of claim 24, wherein the drive component comprises a head capable of reading, writing, or both reading and writing data on the computer-readable medium, a holder configured to hold the computer-readable medium in the operating position, and a drive assembly coupled to the holder, wherein the drive assembly is configured to selectively move the computer-readable medium between the operating position and the access position, the method further comprising providing a disabling system, the disabling system comprising a second computer-readable medium coupled to the processor, the second computer-readable medium containing a program code that causes the processor to (a) disable the drive assembly upon a protected disable command to prevent the holder from being moved from the operating position to the access position, and to (b) enable the drive assembly upon a protected enable command to activate the drive assembly for moving the holder between the operating and the access positions;

disabling the drive component by entering the protected disable command;

operating the computer and the external drive component to read, write, or both read and write data to the computer-readable medium after entering the protected disable command; and removing the computer-readable medium from the drive component by re-enabling the drive assembly by entering the protected enable command, actuating the drive assembly to move the computer-readable medium from the operating position to the access position, and then disengaging the computer-readable medium from the drive assembly.

29. The method of claim 24, wherein:

the drive component comprises a head capable of reading, writing, or reading and writing data on the computer-readable medium, a holder configured to hold the computer-readable medium in the operating position, and a drive assembly having an electrical motor coupled to the holder to selectively move the holder between the operating position and the access position;

the drive component is disabled using a disabling system, the disabling system comprising a switch coupled to the electrical motor and a power supply to connect the motor with or disconnect the motor from the power supply separately from the head; and disabling the drive component comprises opening the switch to disconnect the motor from the power supply.

30. The method of claim 29 wherein the switch is coupled to a manual actuator, and wherein opening the switch comprises manually moving the actuator from an on position to an off position.

31. The method of claim 29 wherein the switch is coupled to the processor and the disabling system further comprises a second computer-readable medium having a program code that causes the processor to open the switch and disconnect the electrical motor from the power supply upon a protected disable command, and wherein opening the switch comprises entering the protected disable command.

32. A drive component for a computer, comprising:

a head capable of reading data on a computer-readable medium;

a holder configured to hold the computer-readable medium in an operating position in which the head can read the data;

a drive assembly coupled to the holder, the drive assembly being configured to selectively move the computer-readable medium from the operating position to an access position wherein the computer-readable medium is accessible to a user; and a disabling system coupled to the drive assembly and having a disabled mode, in which the drive assembly is disabled from moving the computer-readable medium, and an enabled mode, wherein the drive assembly is enabled to move the computer-readable medium, the head being able to read the data when the drive assembly is in its disabled mode.

33. The drive component of claim 32 wherein the disabling system comprises a computer-readable program code adapted to enter the enabled mode upon a protected enable command.

34. The drive component of claim 32 wherein the disabling system comprises a computer-readable program code adapted to enter the disabled mode upon a protected disable command.

35. A computer, comprising:

a processor;

a power supply coupled to the processor;

a drive component including a head capable of reading, writing, or both reading and writing data on a computer-readable medium, the head being coupled to the processor;

a holder configured to hold the computer-readable medium in an operating position in which the head can read, write, or both read and write data on the computer-readable medium;

a drive assembly coupled to the holder, the drive assembly being configured to selectively move the holder, the computer-readable medium, or the holder and the computer-readable medium from the operating position to an access position, the computer-readable medium being accessible to a user in the access position; and a disabling system coupled to the drive assembly and comprising a computer-readable program code, the disabling system selectively disabling the drive assembly from moving the holder, the computer-readable medium, or both the holder and the computer-readable medium from the operating position to the access position, and the disabling system selectively enabling the drive assembly, upon a protected enable command, to move the holder, the computer-readable medium, or both the holder and the computer-readable medium from the operating position to the access position.

36. A computer, comprising:

a processor;

a power supply coupled to the processor;

a drive component including a head capable of reading, writing, or both reading and writing data on a computer-readable medium, the head being coupled to the processor;

a carriage configured to hold the computer-readable medium, the carriage being moveable between an operating position in which the head can read, write, or both read and write data on the computer-readable medium and an access position in which the computer-readable medium can be removed from the carriage;

a drive assembly coupled to the carriage, the drive assembly being configured to selectively move the carriage from the operating position to the access position; and a lockout system coupled to the drive assembly and comprising a computer-readable program code, the lockout system selectively disabling the drive assembly from moving the carriage from the operating position to the access position, and, upon a protected enable command, selectively enabling the drive assembly to move the carriage from the operating position to the access position.

37. A drive component for a computer, comprising:

a head capable of reading, writing, or both reading and writing data on a computer-readable medium;

a holder configured to hold the computer-readable medium in an operating position in which the head can read, write, or both read and write data on the computer-readable medium;

a drive assembly coupled to the holder, the drive assembly being configured to selectively move the holder and/or the computer-readable medium from the operating position to an access position, the computer-readable medium being removable from the external drive component in the access position; and a disabling system coupled to the drive assembly and comprising a computer-readable program code, the disabling system selectively disabling the drive assembly from moving the holder, the computer-readable medium, or both the holder and the computer-readable medium from the operating position to the access position, and the disabling system selectively enabling the drive assembly, upon a protected enable command, to move the holder, the computer-readable medium, or both the holder and the computer-readable medium from the operating position to the access position.

38. A drive component for a computer, comprising:

a head capable of reading data from a computer-readable medium;

a carriage configured to hold the computer-readable medium, the carriage being moveable between an operating position in which the head can read and/or write data on the computer-readable medium and an access position in which the computer-readable medium can be removed from the carriage;

a drive assembly coupled to the carriage, the drive assembly being configured to selectively move the carriage from the operating position to the access position; and a lockout system coupled to the drive assembly and comprising a computer-readable program code, the lockout system selectively disabling the drive assembly from moving the carriage from the operating position to the access position and, upon a protected enable command, selectively enabling the drive assembly to move the carriage from the operating position to the access position.

39. A method for operating a computer having a processor, a memory device coupled to the processor, a power supply coupled the memory device and the processor, and a drive component for reading, writing, or both reading and writing data on a computer-readable medium, the method comprising:

loading the computer-readable medium into the drive component by moving the computer readable medium into an operating position in which the drive component can read and/or write data on the computer-readable medium;

disabling the drive component upon a protected disable command from moving the computer-readable medium from the operating position to an access position to prevent access to the computer-readable medium; and operating the drive component to read and/or write data on the computer-readable medium while the drive component is disabled from moving the computer-readable medium from the operating position to the access position.

40. The method of claim 39 further comprising enabling the drive component upon a protected enable command to move computer-readable medium from the operating position to the access position to enable access to the computer-readable medium.

* * * * *